(12) United States Patent
Bianconi et al.

(10) Patent No.: US 11,711,403 B2
(45) Date of Patent: Jul. 25, 2023

(54) MULTIPLE NAMESPACES SUPPORT IN PRIORITY CALL IN IMS NETWORK

(71) Applicant: MAVENIR SYSTEMS INC., Richardson, TX (US)

(72) Inventors: Rick Bianconi, Rowlett, TX (US); Suprabhat Chatterjee, Bangalore (IN)

(73) Assignee: Mavenir Systems, Inc., Richardson, TX (US)

( * ) Notice: Subject to any disclaimer, the term of this patent is extended or adjusted under 35 U.S.C. 154(b) by 0 days.

(21) Appl. No.: 17/505,068

(22) Filed: Oct. 19, 2021

(65) Prior Publication Data

US 2022/0131907 A1 Apr. 28, 2022

(30) Foreign Application Priority Data

Oct. 26, 2020 (IN) .......................... IN202021046659

(51) Int. Cl.
*H04L 65/1016* (2022.01)
*H04L 65/1045* (2022.01)
*H04L 65/1104* (2022.01)

(52) U.S. Cl.
CPC ...... *H04L 65/1045* (2022.05); *H04L 65/1016* (2013.01); *H04L 65/1104* (2022.05)

(58) Field of Classification Search
None
See application file for complete search history.

(56) References Cited

U.S. PATENT DOCUMENTS

| 2010/0128722 A1* | 5/2010 | Madour | H04W 76/18 370/352 |
| 2020/0145465 A1* | 5/2020 | Al-Mehdar | H04L 65/1104 |
| 2021/0044633 A1* | 2/2021 | John | H04L 65/1104 |

(Continued)

OTHER PUBLICATIONS

Extended European Search Report for corresponding European application EP 21204480.4, 7 pages, dated Mar. 4, 2022.

(Continued)

*Primary Examiner* — Duc T Duong
(74) *Attorney, Agent, or Firm* — Ruggiero, McAllister & McMahon LLC

(57) ABSTRACT

A method of call handling when multiple namespaces are present for a call of a priority or emergency call type initiated by a subscriber of a wireless network includes: obtaining, by an originating Proxy Call Session Control Function (P-CSCF), a predetermined precedence order for the multiple namespaces; retrieving, by the originating P-CSCF, each namespace and associated priority from the subscriber's Registration Context; inserting, by the originating P-CSCF, a SIP Resource-Priority header for each namespace and associated priority; and inserting, by the originating P-CSCF, an additional SIP Resource-Priority header with an additional specified namespace (Multiple Namespace Precedence Order (MNPO)) and priority value identifying the predetermined precedence order for the multiple namespaces. The originating P-CSCF uses the namespace with the highest precedence order to select the appropriate values to fill in Reservation-Priority Attribute-Value Pair (AVP) and Multimedia-priority services (MPS) Identifier AVP in Rx interface signaling to a Policy and Charging Rules Function (PCRF).

7 Claims, 1 Drawing Sheet

(56) References Cited

U.S. PATENT DOCUMENTS

2021/0152615 A1* 5/2021 Karampatsis ......... H04W 40/22
2022/0248208 A1* 8/2022 Nayak ................. H04L 65/1104

OTHER PUBLICATIONS

3GPP TS22.153, v.16.0 3rd Generation Partnership Project: Technical Specification Group Services and System Aspects; Multimedia priority service (Release 16); Sep. 2019.

* cited by examiner

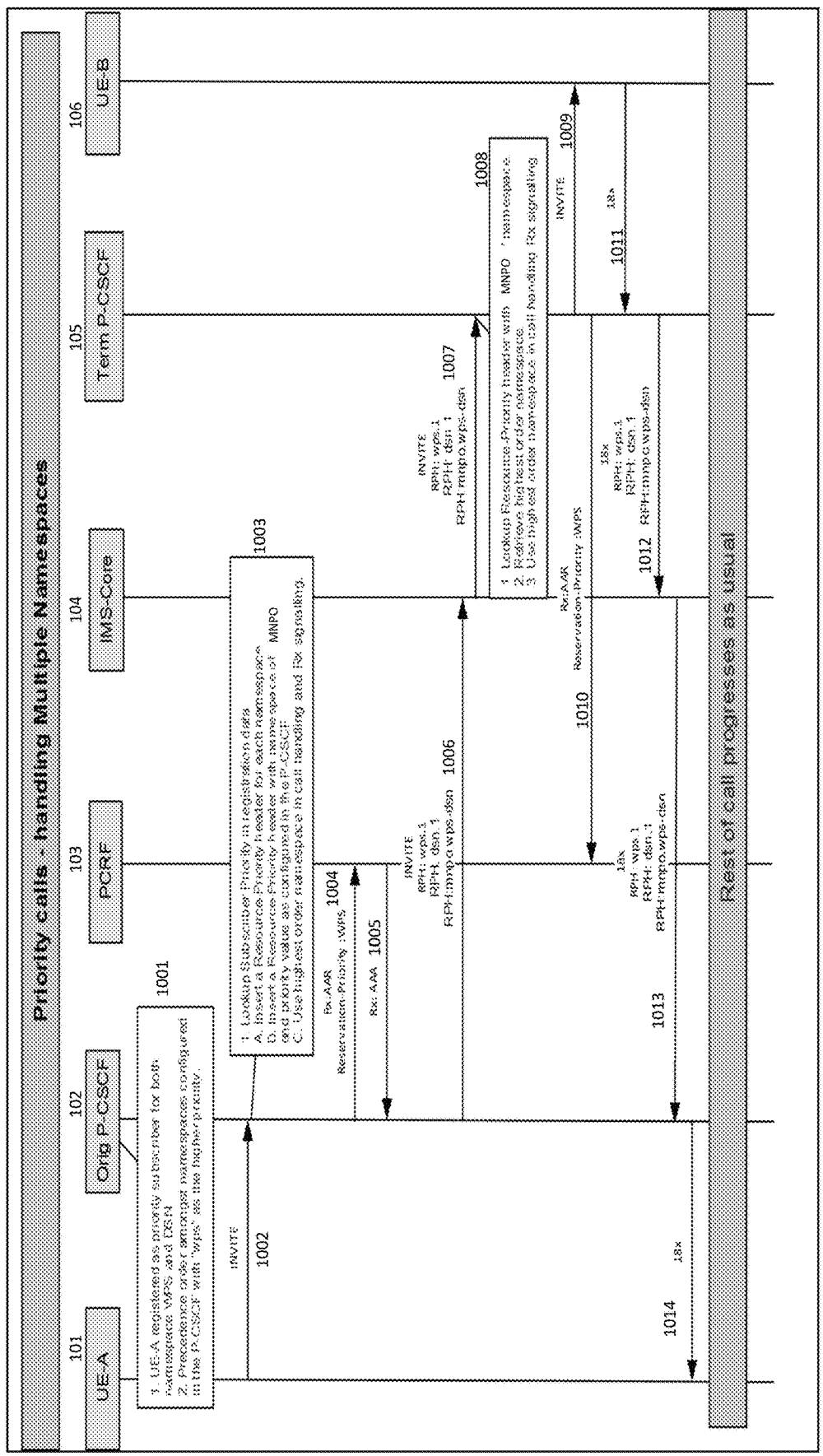

MULTIPLE NAMESPACES SUPPORT IN PRIORITY CALL IN IMS NETWORK

BACKGROUND OF THE DISCLOSURE

1. Field of the Disclosure

The present disclosure relates to IP Multimedia Core Network Subsystem (IMS) network and methods for operating IMS network, and relates more particularly to multiple namespaces support in priority and emergency calls in an IMS network.

2. Description of the Related Art

The IP Multimedia Subsystem (IMS) is an architectural framework for delivering IP multimedia services. Historically, mobile phones have provided voice call services over a switched-circuit-style network, rather than strictly over an IP packet-switched network. Alternative methods of delivering voice or other multimedia services over IP have become available on smartphones (e.g., VoIP), but they have not become standardized across the industry. IMS is an architectural framework to provide standardization.

The main functional entities of IMS include, e.g., Proxy Call Session Control Function (P-CSCF), Serving Call Session Control Function (S-CSCF), Interrogating Call Session Control Function (I-CSCF), and Home Subscriber Server (HSS). Proxy Call Session Control Function (P-CSCF) is the first point of contact between the IMS User Equipment (UE) and the IMS network. Serving Call Session Control Function (S-CSCF), which is the central node of the signaling plane, performs session control and acts as SIP registrar that maintains an association between the IP address of the IMS UE and the user's public user identity, i.e., SIP address of record. Interrogating Call Session Control Function (I-CSCF) is a SIP proxy located at the edge of a network operator's domain, i.e., it is the contact point at the operator's network for users from that network or roaming users which are using services and are located within the network operator's service area. Home Subscriber Server (HSS) is the central repository of user profiles and network connectivity information, e.g., authentication, authorization, user profile information, and S-CSCF association points.

Session Initiation Protocol (SIP) and Diameter are the main signaling protocols used in IMS. The main purpose of the SIP protocol is to establish a real-time multimedia session, e.g., between User Equipments (UEs) using an operator's network. During session establishment, many network functions need to be triggered within the operator's network, e.g., relating to authentication of users, charging, allocation of resources, and application of services. For this purpose, the Third Generation Partnership Project (3GPP) standard mandates the Diameter protocol. The Diameter protocol is used by both Evolved Packet Core (EPC) and IMS for requesting/triggering additional information.

In the 3GPP and Internet Engineering Task Force (IETF) standards, the protocol or solution to support multiple namespaces, e.g., in priority calls and emergency calls in the IMS network, is not defined. Instead, it's left to the network operators to define the precedence when multiple namespaces are present in incoming SIP requests. One of the header fields defined for SIP is Resource-Priority header, and in some deployments, the P-CSCF and other network elements in the call path need to handle multiple namespaces in the SIP Resource-Priority header, e.g., the combination of the "ets" and "wps" namespaces is commonly used. This can happen if the subscriber is provisioned to be part of multiple priority namespaces and this indication is received by the P-CSCF from the S-CSCF during subscriber registration. In such scenarios, the originating P-CSCF needs to decide which namespace to use in order to decide the priority of the particular call not only for itself, but also for the downstream network elements in the path of the particular call. This is because 3GPP TS 22.153 standard indicates that for both the originating and terminating network, the priority of a call is determined based on the originating user's priority information available within the originating P-CSCF. The originating P-CSCF therefore needs to determine a uniform priority treatment of the call by all network elements in the call path.

Therefore, there is a need for solutions to the problems of: i) how to maintain a uniform priority for a call across all network elements in the call path when multiple namespaces are present in the SIP Resource-Priority header; and ii) what values to use on the DIAMETER Rx interface (between the P-CSCF and the Policy and Charging Rules Function (PCRF)) for the Reservation-Priority Attribute-Value Pair (AVP) and Multimedia-priority services (MPS) Identifier AVP when triggering Rx (a 3GPP-defined interface between the P-CSCF and PCRF) by both the originating P-CSCF and terminating P-CSCF, so that the same namespace is used by both.

SUMMARY OF THE DISCLOSURE

The present disclosure relates to a method and a system for i) maintaining a uniform priority for a call across all network elements in the path when multiple namespaces are present in the SIP Resource-Priority header, and ii) providing values to use on the DIAMETER Rx interface (between the P-CSCF and PCRF) for the Reservation-Priority Attribute-Value Pair (AVP) and Multimedia-priority services (MPS) Identifier AVP when triggering Rx interface by both the originating P-CSCF and terminating P-CSCF, so that the same namespace is used by both.

According to an example embodiment of the present disclosure, when multiple namespaces are present in the SIP Resource-Priority header, an objective is to use a single namespace for priority treatment of the call by all the network elements in the call path.

According to an example embodiment of the present disclosure, a method of call handling when multiple namespaces are present for a call of a priority call type initiated by a subscriber of a wireless network includes: obtaining, by an originating Proxy Call Session Control Function (P-CSCF), a predetermined precedence order for the multiple namespaces; retrieving, by the originating P-CSCF, each namespace and associated priority from the subscriber's Registration Context; inserting, by the originating P-CSCF, a SIP Resource-Priority header for each namespace and associated priority; and inserting, by the originating P-CSCF, an additional SIP Resource-Priority header with an additional specified namespace and priority value identifying the predetermined precedence order for the multiple namespaces.

According to an example embodiment of the present disclosure, the additional specified namespace is Multiple Namespace Precedence Order (MNPO), and the SIP Resource-Priority header with the MNPO namespace enables other downstream network elements to identify which of the multiple namespaces to use to determine the priority of the call.

According to an example embodiment of the present disclosure, the originating P-CSCF uses the namespace with the highest precedence order to select the appropriate values to fill in Reservation-Priority Attribute-Value Pair (AVP) and Multimedia-priority services (MPS) Identifier AVP in Rx interface signaling to a Policy and Charging Rules Function (PCRF).

According to an example embodiment of the present disclosure, a terminating P-CSCF: i) retrieves the SIP Resource-Priority header with the MNPO namespace; and ii) retrieves the first namespace specified in the precedence order in the SIP Resource-Priority header with the MNPO namespace.

According to an example embodiment of the present disclosure, the terminating P-CSCF uses the retrieved first namespace specified in the precedence order for at least one of i) priority treatment of the call and ii) to lookup the appropriate values to fill in Reservation-Priority Attribute-Value Pair (AVP) and Multimedia-priority services (MPS) Identifier AVP in Rx interface signaling.

BRIEF DESCRIPTION OF THE FIGURE

FIG. 1 illustrates a schematic signal flow diagram of call handling according to the present disclosure.

DETAILED DESCRIPTION

According to an example embodiment of the present disclosure, the following are defined in the P-CSCF:
1) A configuration table in which multiple namespaces supported by the P-CSCF are defined.
2) A precedence order for the namespaces defined in the configuration table of 1). For example, if both "wps" and "ets" namespaces are present, which should take precedence, or if both "ets" and "esnet" namespaces present, what should take precedence, etc.
3) Behavior of the Originating P-CSCF with respect to inserting the SIP Resource-Priority header when multiple namespaces are defined for the subscriber.
4) Behavior of the Terminating P-CSCF, the Emergency Call Session Control Function (E-CSCF) (which is an IMS core element that aids in routing emergency calls to an appropriate destination), and Interconnect Border Control Function (IBCF) (which provides boundary control between various service provider networks, providing IMS network security in terms of signaling information) with respect to which SIP Resource-Priority namespace is to be used for priority handling and Rx AVP mapping (for the Terminating P-CSCF) when multiple SIP Resource Priority headers are present in an incoming INVITE (which is a session initiation process request in SIP).
5) As per RFC 4412, a new namespace, Multiple Namespace Precedence Order (MNPO), is defined for use in the SIP Resource Priority header when sending priority SIP messages.

In an example embodiment of the present disclosure, the originating P-CSCF, terminating P-CSCF, E-CSCF and IBCF are configured with a precedence (priority) order of one or more namespaces for a given call type (e.g., including call types "priority call" and "emergency call"). This Precedence Order field contains the names of supported namespaces in the order of precedence from high to low, and is used to set the priority value in the new namespace "MNPO" entry in the SIP Resource-Priority header defined herein.

The example table, TABLE 1, shown below indicates that for a PRIORITY call the namespace "wps" has the highest priority, followed by "q735", "dsn" and "ets", in that order.

For an EMERGENCY call, the "esnet" namespace has the highest priority, followed by "ets".

TABLE 1

| Call Type | Namespace Precedence Order |
| --- | --- |
| PRIORITY | "wps-q735-dsn-ets" |
| EMERGENCY | "esnet-ets" |

In an example embodiment of the present disclosure, the handling process at the Originating P-CSCF includes the following:
1) The originating P-CSCF i) retrieves the namespace and the associated priority from the Registration Event NOTIFY message received from the S-CSCF, and ii) stores each of the namespaces and its corresponding priority in the subscriber's registration context.
2) Upon receipt of a SIP INVITE from the User Equipment (UE), the originating P-CSCF determines the Call Type based on the information present in the received INVITE or the subscriber priority information. If the incoming INVITE indicates an emergency call (e.g., via a standard mechanism of service URN indicating urn:service:sos or a dialed digit string such as "911" in North America), the Call Type is set to "EMERGENCY". If the incoming INVITE indicates non-EMERGENCY, the subscriber registration context is queried to determine whether the subscriber is a priority subscriber, in which case the Call Type is set to PRIORITY, and priority handling is applied for this call; otherwise, the call is processed as a normal call.
3) If the subscriber priority in the Registration Context indicates a single namespace, the originating P-CSCF uses it to create the SIP Resource-Priority header in the outgoing INVITE towards the IMS Core network.
4) If the subscriber priority in the Registration Context indicates multiple namespaces, the originating P-CSCF looks up the configured Precedence Order and performs the following:
   a) Retrieves each namespace and associated priority from the subscriber's Registration Context and inserts a SIP Resource-Priority header for each namespace and associated priority.
   b) Inserts an additional SIP Resource-Priority header with a specified namespace ("MNPO" in this example embodiment) and priority value identifying (set to) the precedence order obtained from configuration for the corresponding Call Type. The "MNPO" SIP Resource-Priority header enables the other downstream network elements to know which namespace to use to determine the priority of this call. For example, if the subscriber's priority information in the Registration Context contains the esnet, ets and the wps namespaces, and the precedence order indicates "wps-esnet-ets", the outgoing INVITE will have 4 Resource-Priority headers:
   Resource-Priority: wps.x
   Resource-Priority: esnet.y
   Resource-Priority: ets.z
   Resource-Priority: mnpo.wps-esnet-ets
   c) When multiple namespaces are present for a subscriber, the originating P-CSCF uses the namespace with the highest precedence order to select the appropriate values to fill in the Reservation-Priority AVP and Multimedia-priority services (MPS) Identifier AVP in the Rx interface signaling to the Policy and Charging Rules Function (PCRF).

In an example embodiment of the present disclosure, in the case the SIP Resource-Priority header contains multiple namespaces, the handling process at the Terminating P-CSCF includes the following:
1) Retrieves the SIP Resource-Priority header with a namespace of "MNPO".
2) Retrieves the first namespace from the precedence order in this header, and uses the retrieved namespace for at least one of priority treatment of the call and to lookup the appropriate values to fill in the Reservation-Priority and MPS Identifier AVPs in the Rx interface signaling.

FIG. 1 illustrates a schematic signal flow diagram of call handling, e.g., involving both the Originating P-CSCF and Terminating P-CSCF, among other network elements. FIG. 1 shows UE-A 101, Originating P-CSCF 102, PCRF 103, IMS Core 104, Terminating P-CSCF 105, and UE-B 106. As illustrated in the block 1001, UE-A 101 registers as priority subscriber for both namespaces "wps" and "dsn", and the precedence order amongst the namespace is configured in the Originating P-CSCF 102, with "wps" having the higher priority. Process arrow 1002 shows the SIP INVITE request being received by the Originating P-CSCF 102 from the UE-A 101. At this point, as illustrated in the block 1003, the Originating P-CSCF 102 performs the following: i) look up subscriber priority in the registration data; ii) insert a Resource-Priority header for each namespace; iii) insert a Resource-Priority header with a namespace of "MNPO" and priority value as configured in the Originating P-CSCF 102; and iv) use the highest order namespace in call handling and Rx interface signaling. The process arrow 1004 shows Authentication and/or Authorization Request (AAR) and Reservation-Priority for "wps" being received at the PCRF 103 from the Originating P-CSCF 102. In response, the process arrow 1005 shows Authentication and/or Authorization Answer (AAA) being received at the Originating P-CSCF 102 from the PCRF 103.

Next, as shown by the process arrow 1006 in FIG. 1, Resource-Priority headers (RPHs) "wps.1", "dsn.1", and "mnpo.wps-dsn" (as parts of the SIP INVITE request) are received at the IMS Core 104 from the Originating P-CSCF 102. In turn, as shown by the process arrow 1007, Resource-Priority headers (RPHs) "wps.1", "dsn.1", and "mnpo.wps-dsn" (as parts of the SIP INVITE request) are received at the Terminating P-CSCF 105 from the IMS Core 104. At this point, as illustrated in the block 1008, the Terminating P-CSCF 105 performs the following: i) look up Resource-Priority header with "MNPO" namespace; ii) retrieve the highest order namespace; and iii) use the highest order namespace in call handling and Rx interface signaling. The process arrow 1009 illustrates the SIP INVITE request being received by the UE-B 106 from the Terminating P-CSCF 105. The process arrow 1010 shows Authentication and/or Authorization Request (AAR) and Reservation-Priority for "wps" being received at the PCRF 103 from the Terminating P-CSCF 105. The process arrow 1011 shows a SIP response status code of "18x" class (e.g., 180 Ringing, 182 Queued, 183 Session Progress) being received at the Terminating P-CSCF 105 from the UE-B 106. As shown by the process arrow 1012, Resource-Priority headers (RPHs) "wps.1", "dsn.1", and "mnpo.wps-dsn" accompanying the 18x response are received at the IMS Core 104 from the Terminating P-CSCF 105. In turn, as shown by the process arrow 1013, the IMS Core 104 forwards the RPHs "wps.1", "dsn.1", and "mnpo.wps-dsn" accompanying the 18x response to the Originating P-CSCF 102. The process arrow 1014 shows the Originating P-CSCF 102 forwarding the 18x response to the UE-A 101. The remaining parts of the call handling are performed as conventionally known in the art.

In an example embodiment of the present disclosure, the handling process at other network elements in the call path (e.g., Interconnection Border Control Function (IBCF), S-CSCF, and Telephony Application Server (TAS)) includes the following:
1) Upon receipt of an INVITE either from the IMS core or an interconnected IP network, the downstream network element determines the call type based on the presence of the SIP Resource-Priority header in the incoming INVITE. If at least one SIP Resource-Priority header is present, the Call Type is set to PRIORITY.
2) If multiple namespaces are present (either in a single SIP Resource-Priority header or multiple SIP Resource-Priority headers), the downstream network element retrieves the SIP Resource-Priority header with namespace "MNPO".
3) The downstream network element retrieves the first namespace from the configured Precedence Order mentioned in the "MNPO" header. This namespace is then used for priority treatment (pre-emption/priority queueing, etc.) of the particular call.

What is claimed is:

1. A method of call handling when multiple namespaces are present for a call of a priority call type or emergency call type initiated by a subscriber of a wireless network, comprising:
obtaining, by an originating Proxy Call Session Control Function (P-CSCF), a predetermined precedence order for the multiple namespaces;
retrieving, by the originating P-CSCF, each namespace and associated priority from the subscriber's Registration Context;
inserting, by the originating P-CSCF, a Session Initiation Protocol (SIP) Resource-Priority header for each namespace and associated priority; and
inserting, by the originating P-CSCF, an additional SIP Resource-Priority header with an additional specified namespace and priority value identifying the predetermined precedence order for the multiple namespaces.

2. The method of claim 1, wherein the additional specified namespace is Multiple Namespace Precedence Order (MNPO), and wherein the SIP Resource-Priority header with the MNPO namespace enables other downstream network elements to identify which of the multiple namespaces to use to determine the priority of the call.

3. The method of claim 2, further comprising:
using, by the originating P-CSCF, the namespace with the highest precedence order to select the appropriate values to fill in Reservation-Priority Attribute-Value Pair (AVP) and Multimedia-priority services (MPS) Identifier AVP in Rx interface signaling to a Policy and Charging Rules Function (PCRF).

4. The method according to claim 2, further comprising:
retrieving, by a terminating P-CSCF, the SIP Resource-Priority header with the MNPO namespace.

5. The method according to claim 4, further comprising:
retrieving, by the terminating P-CSCF, the first namespace specified in the precedence order in the SIP Resource-Priority header with the MNPO namespace.

6. The method according to claim 5, further comprising:
using, by the terminating P-CSCF, the retrieved first namespace specified in the precedence order for at least one of i) priority treatment of the call and ii) to lookup the appropriate values to fill in Reservation-Priority Attribute-Value Pair (AVP) and Multimedia-priority services (MPS) Identifier AVP in Rx interface signaling.

7. The method according to claim 1, further comprising: upon receipt of a SIP INVITE from the User Equipment (UE), determining by the originating P-CSCF, a call type based on one of i) information present in the received SIP INVITE or ii) subscriber priority information in the subscriber's Registration Context, wherein the call type is one of emergency, priority or normal.

\* \* \* \* \*